(12) United States Patent
Ozguc et al.

(10) Patent No.: US 12,214,672 B2
(45) Date of Patent: Feb. 4, 2025

(54) SHORT CIRCUIT PROTECTION SYSTEM FOR BATTERY PACKS

(71) Applicant: ISTANBUL TEKNIK UNIVERSITESI, Istanbul (TR)

(72) Inventors: Murat Kubilay Ozguc, Istanbul (TR); Derya Ahmet Kocabas, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 199 days.

(21) Appl. No.: 18/019,246

(22) PCT Filed: May 9, 2022

(86) PCT No.: PCT/TR2022/050405
§ 371 (c)(1),
(2) Date: Feb. 2, 2023

(87) PCT Pub. No.: WO2022/265597
PCT Pub. Date: Dec. 22, 2022

(65) Prior Publication Data
US 2023/0286384 A1    Sep. 14, 2023

(30) Foreign Application Priority Data
Jun. 14, 2021  (TR) ............................... 2021/009693

(51) Int. Cl.
*B60L 3/00* (2019.01)
*B60L 3/04* (2006.01)
*H02H 7/18* (2006.01)

(52) U.S. Cl.
CPC ............ *B60L 3/0046* (2013.01); *H02H 7/18* (2013.01); *B60L 3/04* (2013.01)

(58) Field of Classification Search
CPC ............ B60L 3/0046; B60L 3/04; H02H 7/18
(Continued)

(56) References Cited

U.S. PATENT DOCUMENTS

| 5,963,019 A | 10/1999 | Cheon |
| 2017/0025843 A1 | 1/2017 | Liu et al. |

(Continued)

FOREIGN PATENT DOCUMENTS

| CN | 111244883 A | * | 6/2020 | ............... H02H 3/08 |
| CN | 112865767 A | * | 5/2021 | ......... H03K 17/0822 |
| CN | 111244883 B | * | 9/2021 | ............... H02H 3/08 |

*Primary Examiner* — Dharti H Patel
(74) *Attorney, Agent, or Firm* — Bayramoglu Law Offices LLC

(57) ABSTRACT

A short circuit protection system for high voltage battery packs which is semiconductor based and provides protection with a faster response time, comprises a desaturation circuit comprising a resistor, a capacitor, and a diode, a MOSFET connected with the desaturation circuit, a driver for driving the MOSFET, a gate resistor with one end connected with the driver and another end connected with the MOSFET, a amplifier circuit configured to amplify the voltage signal passing through the gate resistor, a integral circuit connected with the output of the amplifier circuit and is configured to integrate the current measured from the gate resistor to find the load value of the gate resistor, a gate comparison circuit with one input connected with the gate resistor and another input connected with the integral circuit, a comparison circuit with one input connected with the desaturation circuit and another input connected with the gate comparison circuit.

7 Claims, 1 Drawing Sheet

(58) Field of Classification Search
USPC .......................................................... 361/86
See application file for complete search history.

(56) References Cited

U.S. PATENT DOCUMENTS

2018/0183228 A1* 6/2018 Huber .............. G01R 19/16571
2018/0331544 A1   11/2018 Dulle

* cited by examiner

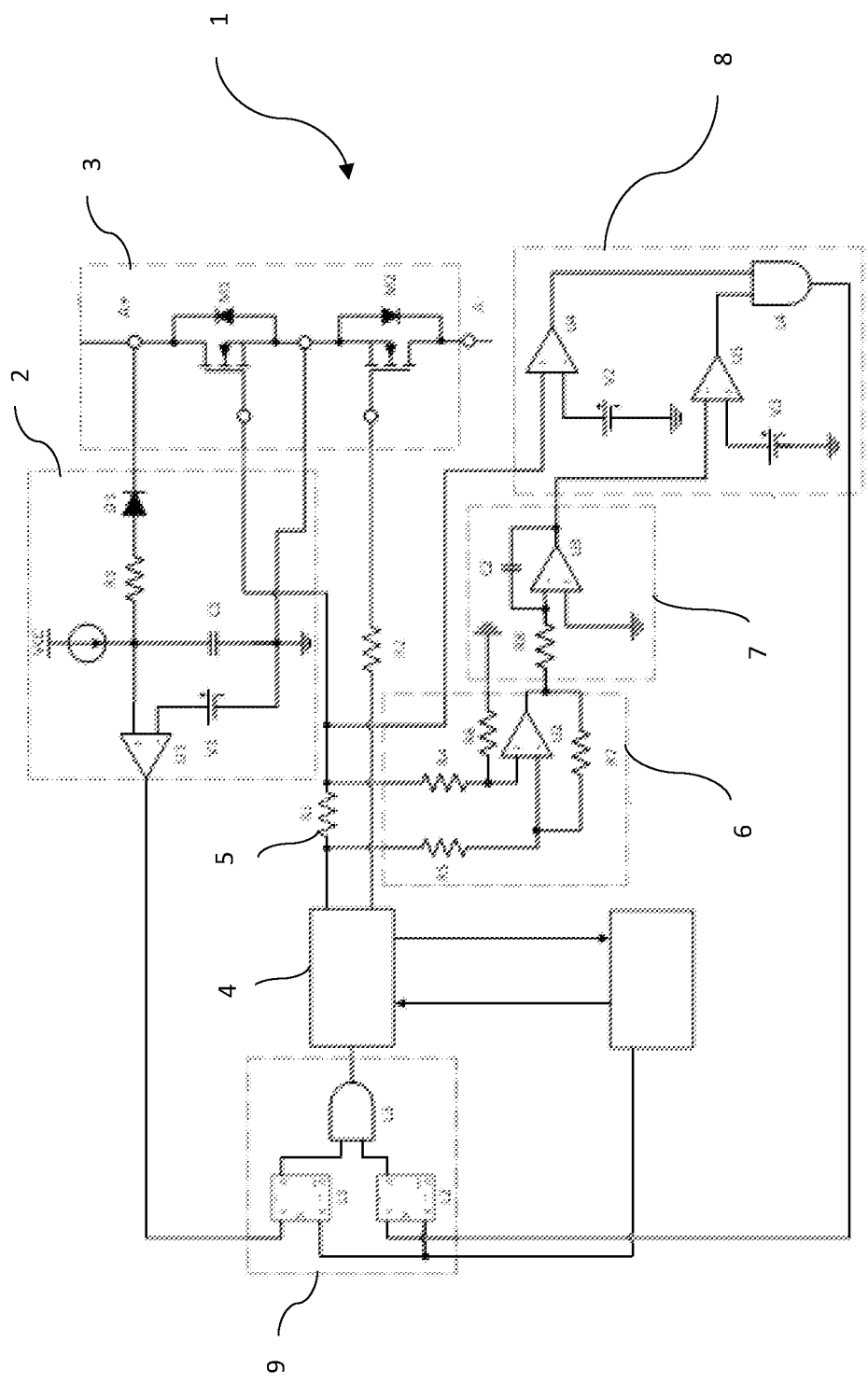

SHORT CIRCUIT PROTECTION SYSTEM FOR BATTERY PACKS

CROSS-REFERENCES TO THE RELATED APPLICATIONS

The application is a national stage entry of PCT/TR2022/050405 filed on May 9, 2022, which claims priority to patent application No. TR 2021/009693 filed on Jun. 14, 2021, the entire contents of which are incorporated herein by reference.

TECHNICAL FIELD

The present invention relates to a short circuit protection system for battery packs present in electric vehicles.

BACKGROUND

High voltage batteries have gained great importance especially with the widespread use of electric vehicles. For this reason, the development works on the battery pack have accelerated. One of the biggest problems of battery packs is that the short-circuit protection cannot be done sufficiently and at a desired level.

In the state of the art, short circuit protection in battery packs is provided by means of electromechanical contactor, melting fuse or pyro fuse. Commonly, a protection system is used, which is realized by means of the fuse and the electromechanical contactor working together. The protection provided by this method has a slow response time and in case that it is used in high voltage battery packs, the dimensions and weights of the component are high.

SUMMARY

The objective of the present invention is to provide a short circuit protection system to provide a semiconductor-based protection in high voltage battery packs.

The objective of the present invention is to provide a short circuit protection system which can react more quickly and is easy to be adapted to the needs of the system in high voltage battery packs.

BRIEF DESCRIPTION OF THE DRAWINGS

A short circuit protection system developed to fulfill the objective of the present invention is illustrated in the accompanying figures, in which, FIG. 1 is the schematic view of the short circuit protection system.

The components shown in the figures are each given reference numbers as follows:
1. Short circuit protection system
2. Desaturation circuit
3. MOSFET
4. Driver
5. Gate resistor
6. Amplifier circuit
7. Integral circuit
8. Gate comparison circuit
9. Comparison circuit

DETAILED DESCRIPTION OF THE EMBODIMENTS

A short circuit protection system (1) preferably for high voltage battery packs which is semiconductor based and can provide protection with a faster response time, essentially comprises at least one desaturation circuit (2) comprising at least one resistor, at least one capacitor and at least one diode, at least one MOSFET (3) which is connected with the desaturation circuit (2), at least one driver (4) which is for driving the MOSFET (3), at least one gate resistor (5) one end of which is connected with the driver (4) and the other end of which is connected with the MOSFET (3), at least one amplifier circuit (6) which is configured to amplify the voltage signal passing through the gate resistor (5), at least one integral circuit (7) which is connected with the output of the amplifier circuit (6) and is configured to integrate the current measured from the gate resistor (5) to find the load value of the gate resistor (5), at least one gate comparison circuit (8), one input of which is connected with the gate resistor (5) for measuring the voltage passing through the gate resistor (5), and the other input of which is connected with the integral circuit (7) for measuring the load on the gate resistor (5), and which is configured to compare these voltage and load values, at least one comparison circuit (9), one input of which is connected with the desaturation circuit (2) and the other input of which is connected with the gate comparison circuit (8), and which is configured to compare error signals from the desaturation and gate comparison circuits (2, 8) and generate the result signal.

The short circuit protection system (1) of the present invention comprises at least one desaturation circuit (2). The desaturation circuit (2) is comprised of a R1 resistor, C1 capacitor, and D1 diode. During normal operation, the capacitor voltage is fixed at the MOSFET conduction voltage. In case of a short circuit, the capacitor voltage is quickly loaded at the threshold voltage and triggers the device to turn off. There is a power supply at the desaturation circuit (2). In the desaturation circuit (2), R1 resistor and D1 diode are connected in series. C1 capacitor is connected in parallel. R1 resistor, D1 diode and C1 capacitor are connected to the input terminal of an operational amplifier.

The short circuit protection system (1) comprises at least one MOSFET (3) which is connected with the desaturation circuit (2). In the preferred embodiment of the invention, there are two MOSFETs (3) connected in reverse series. With the MOSFET (3) configuration connected in reverse series, it is provided to work in both charge and discharge directions. At least one driver is connected to drive the said MOSFET (3) configuration. The gate output of each MOSFET (3) is connected with the driver (4). To measure the voltage and/or current to the MOSFET (3), at least one resistor is added between the gate output of the MOSFET (3) and the driver (4) output.

In order to measure the gate current, the amplifier circuit (6) which is used to amplify the voltage signal measured over the gate resistor (5) is integrated to the short circuit protection system (1). The amplifier circuit (6) is positioned parallel to the gate resistor (5).

At least one integral circuit (7) is positioned at the output of the amplifier circuit (6). The integral circuit (7) is configured to integrate the current measured from the gate resistor (5) to find the load value of the gate resistor (5). This circuit integrates the signal applied to its input and transfers it to the output.

At least one gate comparison circuit (8) is positioned, one input of which is connected with the gate resistor (5) for measuring the voltage passing through the gate resistor (5)

and the other input of which is connected with the integral circuit (7) for measuring the load on the gate resistor (5). The said circuit is configured to obtain an error signal by comparing both the gate voltage and the gate load with the specified reference values.

Error signals generated in the gate comparison circuit (8) and desaturation circuit (2) are transmitted to the comparison circuit (9). The output of the gate comparison circuit (8) is connected with the input of the comparison circuit (9). The output of the desaturation circuit (2) is connected with the input of the comparison circuit (9). There is at least one logic gate in the comparison circuit (9). The logic gate is configured to generate the final error signal to compare the error signals. The output of the comparison circuit (9) is connected with the driver (4).

In a preferred embodiment of the invention, the logic gate in the comparison circuit (9) is an AND gate.

In a preferred embodiment of the invention, the configuration of MOSFET (3) connected in reverse series can be added in parallel to the configuration of MOSFET (3) connected in reverse series. Thus, the system is not insufficient against the current requirement.

The invention claimed is:

1. A short circuit protection system preferably for high voltage battery packs which is semiconductor based and provides protection with a faster response time, comprising:
    at least one desaturation circuit comprising at least one resistor, at least one capacitor, and at least one diode,
    at least one MOSFET connected with the desaturation circuit,
    at least one driver for driving the MOSFET,
    at least one gate resistor, wherein one end of the at least one gate resistor is connected with the driver and the other end of the at least one gate resistor is connected with the MOSFET,
    at least one amplifier circuit configured to amplify the voltage signal passing through the gate resistor,
    at least one integral circuit connected with the output of the amplifier circuit and is configured to integrate the current measured from the gate resistor to find the load value of the gate resistor,
    at least one gate comparison circuit, wherein one input of the at least one gate comparison circuit is connected with the gate resistor for measuring the voltage passing through the gate resistor and the other input of the at least one gate comparison circuit is connected with the integral circuit for measuring the load on the gate resistor and comparing the voltage and load values,
    at least one comparison circuit, wherein one input of the at least one comparison circuit is connected with the desaturation circuit and the other input of the at least one comparison circuit is connected with the gate comparison circuit and is configured to compare error signals from the desaturation and gate comparison circuits and generate a result signal.

2. The short circuit protection system according to claim 1, wherein the at least one MOSFET is connected in reverse series.

3. The short circuit protection system according to claim 2, wherein the comparison circuit further comprises at least one logic gate.

4. The short circuit protection system according to claim 2, wherein the comparison circuit further comprises an AND logic gate.

5. The short circuit protection system according to claim 1, wherein the comparison circuit further comprises at least one logic gate.

6. The short circuit protection system according to claim 5, wherein the comparison circuit further comprises an AND logic gate.

7. The short circuit protection system according to claim 1, wherein the comparison circuit further comprises an AND logic gate.

* * * * *